Jan. 5, 1954  P. SCHROEDER  2,665,139
HAND TRUCK WITH BALL JOINT COUPLING
Filed July 16, 1951  3 Sheets-Sheet 2

INVENTOR
PAUL SCHROEDER
BY

Patented Jan. 5, 1954

2,665,139

UNITED STATES PATENT OFFICE 2,665,139

HAND TRUCK WITH BALL JOINT COUPLING

Paul Schroeder, Hamburg, Germany, assignor to Karl H. Bartels, Hamburg-Schenefeld, Germany, a firm Application July 16, 1951, Serial No. 237,010

Claims priority, application Germany August 1, 1950

14 Claims. (Cl. 280—46)

The present invention relates to hand trucks and more particularly to hand trucks of the type having a detachable front part.

The known hand trucks of this type have the disadvantage that the draft handle which is attached to the front wheels must be manually held in a predetermined position which is tiring for the operator.

It is an object of the present invention to avoid this disadvantage of the known constructions by providing a ball joint coupling between the truck body and the detachable front part comprising front wheels and draft handle.

It is another object of the present invention to provide a hand truck to which a detachable front part may be easily attached and detached.

It is a further object of the present invention to provide a coupling for hand trucks which engages the detachable front part of the device in such manner that it may not be detached during operation by pushing or pulling.

It is a still further object of the present invention to provide a coupling for hand trucks which permits easy steering.

With these objects in view the present invention mainly comprises a truck body and rear wheels supporting the truck body at the rear end thereof, and in combination therewith front wheel means, a shaft rotatably supporting the front wheel means, a combined supporting and pulling arrangement mounted on the shaft turnably relative to the front wheel means and including a supporting member and an elongated draft member serving as a lever arm for turning the supporting member about the axis of the shaft, and a ball joint composed of a socket member having a substantially spherical inner surface portion and a ball member detachably engaging the spherical inner surface portion of the socket member so as to be relatively turnable at least about a horizontal and a vertical axis, one of the two members forming the ball joint being fixedly secured to the front end of the truck body and the other being fixedly secured to the supporting member, the two members forming the ball joint being detachable from and connectable to each other by relative movement in a substantially vertical direction whereby the front wheel means may be detached from the truck body and connected again thereto by turning the draft member about the shaft so as to cause turning of the supporting member resulting in a vertical downward and upward movement, respectively, of the other of the two members forming the ball joint, and whereby the hand truck may be steered by turning the draft member resulting in turning of the other of the two members forming the ball joint about the vertical axis.

The socket member of the ball joint according to the present invention engages with its spherical inner surface portion the ball member in such a manner that the supporting member remains in a vertical position during pushing and pulling of the hand truck.

According to a preferred embodiment of the present invention the socket member is formed as a tube from which a portion has been cut off so that a projection remains having an inner surface portion which is substantially semicircular in cross-section and which is connected with a spherical inner surface portion in the socket member so that the ball member may slide along the inner surface of the projection into a position engaging the spherical inner surface portion while the detachable front part of the hand truck comprising front wheels, supporting member and draft member is being connected with, or detached from the truck body.

It is also advantageous to provide abutment means engaging the socket member when the front part of the truck is connected to the truck body. The abutment means are provided to assure a reliable connection between the ball member and the socket member.

Preferably the draft handle is pivotally mounted on the supporting member movable between a vertical position and an inclined position, while means are provided to secure the draft handle in either position. Thereby the highly advantageous result is attained that the draft member may be placed into a vertical position when being transported in elevators or elsewhere where only little space is available.

According to a preferred embodiment of the invention the draft handle may be operatively connected to abutment means so that the same move together with the draft handle and engage the socket member locking the ball joint when the draft handle is in a vertical position.

The abutment means may be shaped as a socket corresponding to the socket member and arranged opposite and facing the same so that the ball member may be completely enclosed by the socket member on one side and by the socket shaped abutment means on the other side when the draft handle is placed in a vertical position.

In the event that the abutment means are operatively connected to the draft member as above described, the ball joint is locked as long as the draft member remains in vertical position and the front part of the hand truck can only be detached from the truck body after the draft member has been pivoted into an inclined position. A further embodiment of the present invention permits lifting of a supported platform off its supports and transporting the same. According to this embodiment the ball member engages a socket member which is pivoted to the front end of the truck body. The rear end of the truck body may be supported by toggle means, which may be operatively connected by lever means to the draft member so that the rear portion of the platform is simultaneously lifted when the front portion of the platform is lifted by pushing the front wheels under the platform of the hand truck. As a result the supported platform remains in horizontal position while being lifted.

The shaft of the front wheels is preferably arranged rearwardly of the ball joint and of the axis about which the detachable front part of the hand truck turns. By this arrangement, bumps against the wheels are prevented from being transmitted to the draft member and the ball joint, which may cause a relative movement of the socket member and of the ball member and disengagement of the ball joint.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Referring now to the drawings, Figs. 1 to 5 show a preferred embodiment of the invention. The detachable front part of the hand truck comprises two wheels 1 and 2, rotatably mounted on a shaft 3. Pivotally mounted on the shaft 3 is a combined supporting and pulling arrangement comprising a supporting member 4 and a forked pulling arm 5 on the end of which a draft handle 7 is mounted pivotally about a pin 6. The draft handle 7 may be secured in two positions by means of a pin 10 put through holes 9 in the enlarged end portion of the draft handle. To avoid pivoting of the draft member beyond its extreme positions stops 11 and 12 for the fork-shaped pulling member are provided on the enlarged portion of the draft handle 5. The supporting member 4 is provided at its end with a ball member 5a which is part of a ball joint comprising a socket member 21 secured to the front end 20 of the platform of a hand truck (only partly shown). Supports 22 and 23 are provided for the front end of the platform while the rear end thereof is supported by rear wheels (not shown).

Lever 14 is mounted pivotally about a shaft 13 in the fork-shaped pulling member 5. A foot engaging member 18 is provided, by means of which lever 14 may be pressed downwardly against the action of a spring 15 urging lever 14 upwardly. A screw 16 secures spring 15 to the pulling member 5 or to the support 17 which is fixedly connected to the pulling member 5 and supports the front part of the hand truck when the same is detached from the truck body. At the free end of the lever 14 an abutment 19 is provided for engaging the socket member 21.

The socket member 21 has a spherical inner surface portion fitting on the ball member 5a and ending in an inner surface of substantially semi-circular cross-section provided in a downwardly extending projection 21a. The projection 21a of the socket member 21 engages the supporting member 4, and the abutment 19 engages the outside of the projection 21a, when the front part is attached to the truck body.

Figures 1, 2:
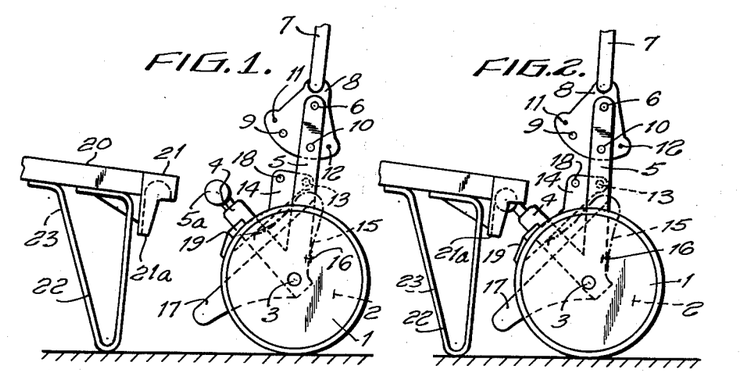
Fig. 1 is a side view of a preferred embodiment of the present invention showing the front part of the hand truck detached.
Fig. 2 is a side view similar to Fig. 1 showing the ball member engaging the socket member.

Fig. 1 shows the front part of the hand truck detached from the platform. The ball member 5a is inserted into the socket member 21 in inclined position of the supporting member 4 whereby a narrowed neck portion of the ball member assures an engagement in this position (Fig. 2).

Figures 3, 4:
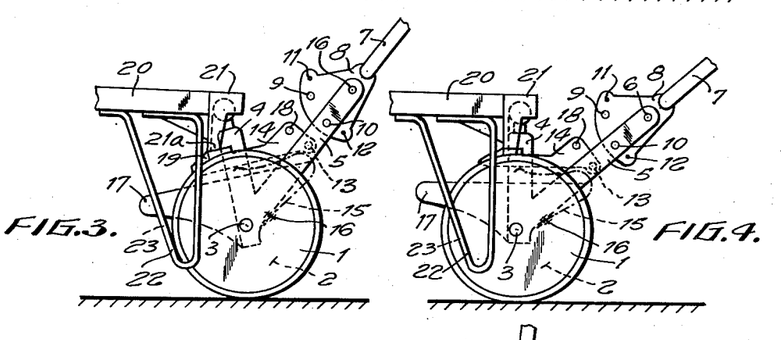
Fig. 3 is a side view similar to Fig. 1 showing lifting of the truck body.
Fig. 4 is a side view similar to Fig. 1 showing the ball joint in engaged position.

By pressing down the draft member 7 the supporting member 4 is pivoted into a vertical position (Figs. 3 and 4), while simultaneously the front end of the platform 20 is lifted. During this operation the abutment 19 on the lever 14 is pressed downwardly by the projection 21a of the socket member 21 against the action of the spring 15 (Fig. 3). As soon as the supporting member 4 is in vertical position, the projection 21a of the socket member 21 releases the abutment 19 so that it is urged by the spring 15 into the position shown in Fig. 4 engaging the rear of the projection 21a of the socket member. The socket member 21 is thereby locked between the ball member and the abutment 19, and the front part of the hand truck can only be detached from the platform when the lever 14 is pressed downwardly by pressure on the foot engaging member 18 against the action of the spring 15 so as to disengage abutment 19 from the socket member.

Figure 5:
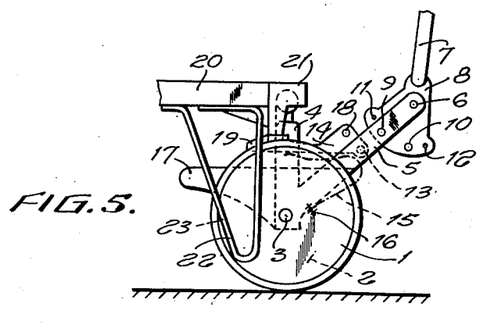
Fig. 5 is a side view similar to Fig. 1 showing the draft handle pivoted into vertical position.

For storing, or for transporting the hand truck in elevators with attached front part, the draft member 7 may be locked in a vertical position by a pin passing through the fork-shaped pulling member 5 and the bore 9 in the enlarged end portion of the draft member (Fig. 5).

Figure 6:
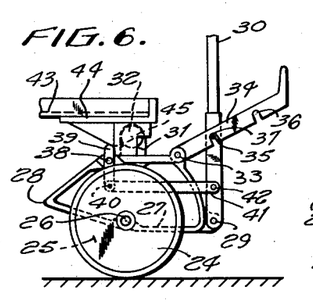
Fig. 6 is a side view of another embodiment of the invention.
Figure 7:
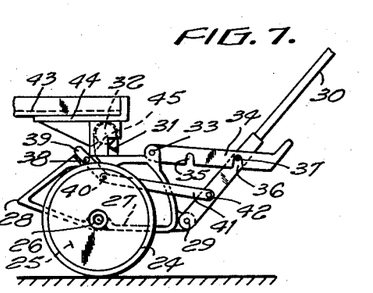
Fig. 7 is a side view of the embodiment shown in Fig. 6 showing the draft handle in inclined position.

Figs. 6 and 7 show a modified embodiment of the invention. The detachable front part of the hand truck has two wheels 24 and 25 on whose shaft 26 a supporting frame 27 is mounted which replaces in this embodiment the supporting member and the pulling member of the embodiment shown in Figs. 1 to 5. Frame 27 has a projecting angular portion 28 which supports the front part of the hand truck when detached from the platform. The draft member 30 is pivotally mounted about a pivot 29 provided on the supporting frame 27. A short support 31 is secured to the frame 27 and ends in the ball member 32 engaging the socket member 45 mounted on a base 44 secured to the platform 43. Socket member 45 is shaped similar to the socket member of the embodiment shown in Fig. 1, open towards the front, so that the ball member 32 may be inserted easily.

On the frame 27 a pivot 38 is arranged on which an abutment lever 39 is pivotally mounted. The lower end of the abutment lever 39 is pivotally connected at 40 to the end of a bar 42 whose other end is pivoted at 42 to the draft member 30. When draft member 30 is moved into a vertical position the abutment lever 39 moves parallel thereto into a vertical position and engages securely socket member 45 whereby pushing and pulling of the hand truck is made possible when the draft member 30 is in vertical position. Disengagement of the ball joint is only possible when the draft member is in inclined position. Draft member 30 may be secured in a vertical or in an inclined position by means of a member 34 pivoted at 33 to the frame 27, and provided with recesses 35 and 36 for engaging a pin 37 which is fixedly secured to the draft member 30 (Figs. 6 and 7).

Figure 8:
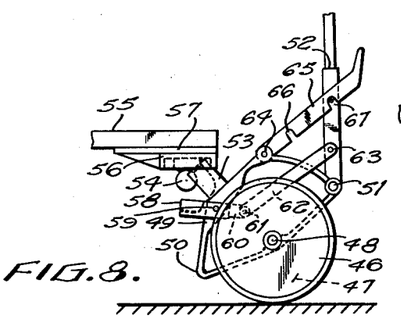
Fig. 8 is a side view of a further embodiment of the invention.
Figure 9:
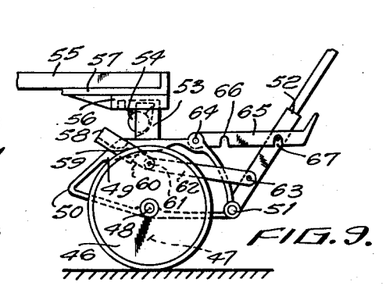
Fig. 9 is a side view of the embodiment shown in Fig. 8 with the socket member engaging the ball member.
Figure 10:
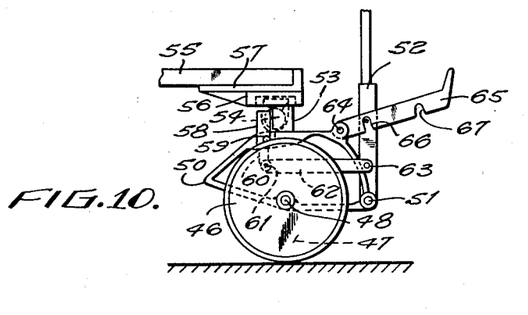
Fig. 10 is a side view of the embodiment shown in Fig. 8 with the draft handle in vertical position.

Figs. 8 to 10 show a further embodiment of the invention. The construction of this embodiment is similar to the construction of the embodiment shown in Figs. 6 and 7, but the ball member 54 is secured to the platform of the hand truck while the socket member 53 is secured to the detachable front part thereof.

A supporting frame 49 having a projecting angular portion 50 is turnably mounted on the wheels 46 and 47. A draft member 52 is pivotally mounted on the frame at 51 and may be secured in a vertical or in an inclined position by means of the member 65 pivotally mounted to the frame at 64 and provided with recesses 66 adapted to engage a pin 67 secured to the draft member 52. The socket member 53 is secured to the frame and engages a ball member 54 secured to the underside of the platform 55. The ball member 54 is surrounded by a ring-shaped abutment member 56. In engaged position, as shown in Figs. 9 and 10, socket member 53 is seated in an annular groove defined by the ball member 54 and by the abutment member 56, and is turnable therein. Abutment 56 and ball member 54 are mounted on a base 57 which is secured to the underside of the platform 55.

A socket-shaped abutment means 58 having a partly spherical and partly cylindrical inner surface is pivotally mounted at 59 to the frame and is pivoted at its lower end at 61 to a bar 62 which is pivoted at 63 to the draft member 52 so that the socket-shaped abutment member is moved into a vertical position when the draft member 52 is placed into a vertical position. In this position the socket member 53 and the socket-shaped abutment member 58 are arranged opposite each other with their inner surfaces facing each other and enclose the ball member 54 and prevent an accidental disengagement.

Figures 11, 12, 12A:
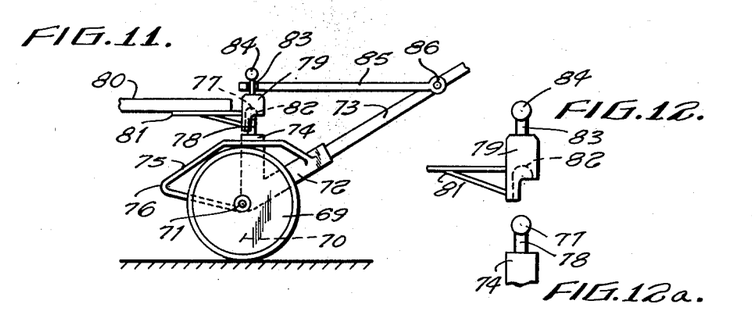
Fig. 11 is a side view of a still further embodiment of the invention.
Fig. 12 is a side view of the socket member used in the embodiment of Fig. 11.
Fig. 12a is a partial side view of a ball member.

The embodiment of the invention shown in Figs. 11 and 12 has two front wheels 69 and 70 mounted on a shaft 71. A pulling member 72 ends in a draft handle 73 and is pivotally mounted on the shaft 71 together with a supporting member 74 and a frame 75 having a projecting angular supporting portion 76. The supporting member 74 is provided at its upper end with a ball member 77 having a neck portion 78 (Fig. 12a), which assures reliable engagement of the ball member in a socket member 79, as in the embodiment shown in Figs. 1 to 5.

The socket member 79 is secured to the platform 80 by means of a frame 81 and is provided with an inner surface portion 82 adapted to engage the ball member. A second ball member 84, having a neck portion 83, is arranged at the top of the socket member 79. A rod 85 pivoted at 86 to the draft member 73 is provided at its free end with a hole through which ball member 84 passes. When the rod 85 is brought into engagement with ball member 84, the front part of the hand truck is locked to the platform and cannot be unintentionally detached by bumps against the wheels since the weight of the rod 73 and the pulling force presses the edge of the hole in the rod 85 against the neck portion 83 so that the rod 85 cannot pass the ball 84.

Figure 13:
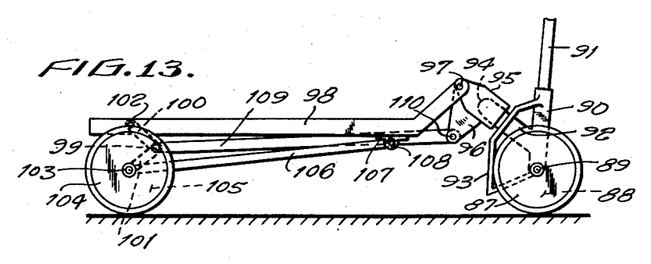
Fig. 13 is a side view of a still further embodiment of the invention.
Figure 14:
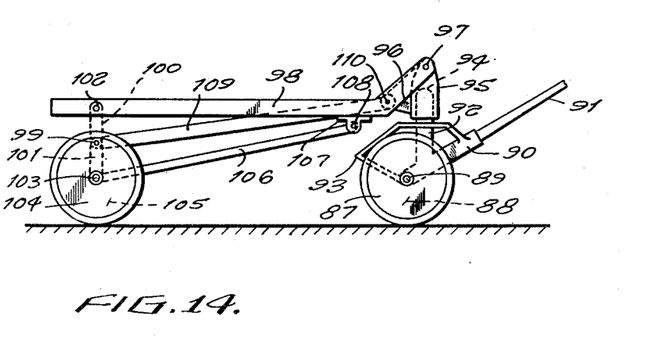
Fig. 14 is a side view of the embodiment shown in Fig. 13 with the truck body lifted.

Figs. 13 and 14 illustrate a further embodiment of the invention which is particularly suitable for lifting a platform resting on four supports. A pulling member 90 ending in a draft member 91 and provided with a supporting member 92 extending at an acute angle to the pulling member, is mounted on the shaft 89 of the front wheel 87 and 88. A frame 93 is mounted on the shaft 89 and the pulling member 90.

The supporting member 92 has a ball-shaped end portion 94 which engages the inner surface of a socket member 95 provided with a laterally extending projection 96.

The socket member 95 is pivotally mounted at 97 on the front end of the platform 98. The rear end of the platform 98 is supported by toggle joint comprising the arms 100 and 101, pivotally connected at 99 to each other and to one end of a bar 109. The free end of arm 100 is pivoted at 102 to the rear end of the platform, while the free end of arm 101 is pivoted to the shaft 103 of the rear wheels 104 and 105. A bar 106 connects the shaft 103 with the front end of the platform and is pivoted to a support 107 by means of a pivot 108. The other end of bar 109 is pivotally connected to the projection 96 of the socket member at 110.

This embodiment is operated as follows:

The hand truck is placed under a platform resting on four supports (not shown), with its platform 98 lowered as shown in Fig. 13. When draft member 91 is pressed downwardly, supporting member 92 is turned to a vertical position, and socket member 95 assumes a vertical position as shown in Fig. 14. By this operation the front end of the platform 98 is lifted. Simultaneously the bar 106 pulls the shaft 103 of the rear wheels forwardly while the bar 109 pushes the joint 99 of the toggle joint rearwardly whereby the arms 100 and 101 are straightened and lift the rear end of the platform 98. The arrangement is such that the platform 98 remains horizontal during the operation so that the above-mentioned platform is lifted off its four supports, and may be transported.

It will be understood that each of the elements described above, or two or more together, may also find a useful application in other types of hand trucks, differing from the types described above.

While the invention has been illustrated and described as embodied in a hand truck having a detachable front, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a hand truck having a truck body and rear wheel means supporting said truck body at the rear end thereof, in combination, front wheel means; a shaft rotatably supporting said front wheel means; a combined supporting and pulling arrangement mounted on said shaft turnably relative to said front wheel means and including a supporting member and an elongated draft member serving as a lever arm for turning said supporting member about the axis of said shaft; and a ball joint composed of a socket member having a substantially spherical inner surface portion and a curved inner face being a portion of a cylindrical surface and merging into said spherical inner surface portion, and of a male member including a ball member detachably engaging said spherical inner surface portion of said socket member so as to be relatively turnable at least about a horizontal and a vertical axis and a cylindrical shaft portion turnably engaging said curved inner face, one of said two members forming said ball joint being fixedly secured to the front end of said truck body and the other being fixedly secured to said supporting member, said two members forming said ball joint being detachable from and connectable to each other by relative movement in a substantially vertical direction whereby said front wheel means may be detached from said truck body and connected again therefrom by turning said draft member about said shaft so as to cause turning of said supporting member resulting in a vertical downward and upward movement, respectively, of said other of said two members forming said ball joint, and whereby said hand truck may be steered by turning said draft member resulting in turning of said other of said two members forming said ball joint about said vertical axis.

2. In a hand truck having a truck body and rear wheel means supporting said truck body at the rear end thereof, in combination, front wheel means; a shaft rotatably supporting said front wheel means; a combined supporting and pulling arrangement mounted on said shaft turnably relative to said front wheel means and including a supporting member having a cylindrical end portion and an elongated draft member serving as a lever arm for turning said supporting member about the axis of said shaft; and a ball joint composed of a socket member having a substantially spherical inner surface portion and a curved inner face being a portion of a cylindrical surface and merging into said spherical inner surface portion, and a ball member detachably engaging said spherical inner surface portion of said socket member so as to be relatively turnable at least about a horizontal and a vertical axis, said socket member being fixedly secured to the front end of said truck body and said ball member being fixedly secured to said cylindrical end portion of said supporting member, said cylindrical end portion of said supporting member turnably engaging said curved inner face, said ball member being detachable from and connectable to said socket member by a substantially vertical downward and upward movement, respectively, whereby said front wheel means may be detached from said truck body and connected again therefrom by turning said draft member about said shaft so as to cause turning of said supporting member resulting in a vertical downward and upward movement, respectively, of said ball member, and whereby said hand truck may be steered by turning said draft member resulting in turning of said ball member about said vertical axis.

3. In a hand truck having a truck body and rear wheel means supporting said truck body at the rear end thereof, in combination, front wheel means; a shaft rotatably supporting said front wheel means; a combined supporting and pulling arrangement mounted on said shaft turnably relative to said front wheel means and including a supporting member and an elongated draft member serving as a lever arm for turning said supporting member about the axis of said shaft; and a ball joint composed of a socket member having a substantially spherical inner surface portion and a curved inner face being a portion of a cylindrical surface and merging into said spherical inner surface portion, and of a male member including a ball member detachably engaging said spherical inner surface portion of said socket member so as to be relatively turnable at least about a horizontal and a vertical axis and a cylindrical shaft portion turnably engaging said curved inner face, said male member being fixedly secured to the front end of said truck body and said socket member being fixedly secured to said supporting member and detachable from and connectable to said male member by a vertical downward and upward movement, respectively, whereby said front wheel means may be detached from said truck body and connected again therefrom by turning said draft member about said shaft so as to cause turning of said supporting member resulting in a vertical downward and upward movement, respectively, of said socket member, and whereby said hand truck may be steered by turning said draft member resulting in turning of said socket member about said vertical axis.

4. In a hand truck having a truck body and rear wheel means supporting said truck body at the rear end thereof, in combination, front wheel means; a shaft rotatably supporting said front wheel means; a combined supporting and pulling arrangement mounted on said shaft turnably relative to said front wheel means and including a supporting member having a cylindrical end portion and an elongated draft member serving as a lever arm for turning said supporting member about the axis of said shaft; abutment means mounted on said supporting member; and a ball joint composed of a socket member having a substantially spherical inner surface portion and a ball member detachably engaging said spherical inner surface portion of said socket member so as to be relatively turnable at least about a horizontal and a vertical axis, said socket member being fixedly secured to the front end of said truck body and provided with a vertically downwardly extending projection having a curved inner face being a portion of a cylindrical surface and merging into said spherical inner surface portion, and also having an outer abutment face engaged by said abutment means, said ball member being fixedly secured to said cylindrical end portion of said supporting member, said cylindrical end portion of said supporting member turnably engaging said curved inner face, said ball member being detachable from and connectable to said socket member by a substantially vertical downward and upward movement, respectively, whereby said front wheel means may be detached from said truck body and connected again therefrom by turning said draft member about said shaft so as to cause turning of said supporting member resulting in a vertical downward and upward movement, respectively, of said ball member, and whereby said hand truck may be steered by turning said draft member resulting in turning of said ball member about said vertical axis.

5. In a hand truck having a truck body and rear wheel means supporting said truck body at the rear end thereof, in combination, front wheel means; a shaft rotatably supporting said front wheel means; a combined supporting and pulling arrangement mounted on said shaft turnably relative to said front wheel means and including a supporting member and an elongated draft member serving as a lever arm for turning said supporting member about the axis of said shaft and being pivotally mounted on said supporting member; means to secure said draft member in a vertical and in an inclined position, respectively; and a ball joint composed of a socket member having a substantially spherical inner surface portion and a curved inner face being a portion of a cylindrical surface and merging into said spherical inner surface portion, and of a male member including a ball member detachably engaging said spherical inner surface portion of said socket member so as to be relatively turnable at least about a horizontal and a vertical axis and a cylindrical shaft portion turnably engaging said curved inner face, one of said two members forming said ball joint being fixedly secured to the front end of said truck body and the other being fixedly secured to said supporting member, said two members forming said ball joint being detachable from and connectable to each other by relative movement in a substantially vertical direction whereby said front wheel means may be detached from said truck body and connected again therefrom by turning said draft member about said shaft so as to cause turning of said supporting member resulting in a vertical downward and upward movement, respectively, of said other of said two members forming said ball joint, and whereby said hand truck may be steered by turning said draft member resulting in turning of said other of said two members forming said ball joint about said vertical axis.

6. In a hand truck having a truck body and rear wheel means supporting said truck body at the rear end thereof, in combination, front wheel means; a shaft rotatably supporting said front wheel means; a combined supporting and pulling arangement mounted on said shaft turnably relative to said front wheel means and including a supporting member having a cylindrical end portion and an elongated draft member serving as a lever arm for turning said supporting member about the axis of said shaft and being pivotally mounted on said supporting member; means to secure said draft member in a vertical and in an inclined position, respectively; abutment means pivotally mounted on said supporting member and operatively connected to said draft member so as to be in a substantially vertical operative position when said draft member is in a vertical position; and a ball joint composed of a socket member having a substantially spherical inner surface portion and a ball member detachably engaging said spherical inner surface portion of said socket member so as to be relatively turnable at least about a horizontal and a vertical axis, said socket member being fixedly secured to the front end of said truck body and provided with a vertically downwardly extending projection having a curved inner face being a portion of a cylindrical surface and merging into said spherical inner surface portion, and also having an outer abutment face engaged by said abutment means when the same are in said vertical operative position, said ball member being fixedly secured to said cylindrical end portion of said supporting member, said cylindrical end portion of said supporting member turnably engaging said curved inner face, said ball member being detachable from and connectable to said socket member by a substantially vertical downward and upward movement, respectively, whereby said front wheel means may be detached from said truck body and connected again therefrom by turning said draft member about said shaft so as to cause turning of said supporting member resulting in a vertical downward and upward movement, respectively, of said ball member, and whereby said hand truck may be steered by turning said draft member resulting in turning of said ball member about said vertical axis.

7. In a hand truck having a truck body and rear wheel means supporting said truck body at the rear end thereof, in combination, front wheel means; a shaft rotatably supporting said front wheel means; a combined supporting and pulling arrangement mounted on said shaft turnably relative to said front wheel means and including a supporting member and an elongated draft member serving as a lever arm for turning said supporting member about the axis of said shaft and being pivotally mounted on said supporting member; means to secure said draft member in a vertical and in an inclined position, respectively; first socket-shaped abutment means pivotally mounted on said supporting member and operatively connected to said draft member so as to be moved to a substantially vertical operative position when said draft member is moved to a vertical position; second abutment means fixedly secured to the front end of said truck body; and a ball joint composed of a socket member having a substantially spherical inner surface portion and a curved inner face being a portion of a cylindrical surface and merging into said spherical inner surface portion, and of a male member including a ball member detachably engaging said spherical inner surface portion of said socket member so as to be relatively turnable at least about a horizontal and a vertical axis and a cylindrical shaft portion turnably engaging said curved inner face, said male member being fixedly secured to the front end of said truck body adjacent to said second abutment means, said shaft portion defining with the same a groove adapted to receive an edge portion of said socket member, said male member being adapted to be engaged by said first socket-shaped abutment means when the same is in said vertical operative position, said socket member being fixedly secured to said supporting member and detachable from and connectable to said male member by a vertical downward and upward movement, respectively, whereby said front wheel means may be detached from said truck body and connected again therefrom by turning said draft member about said shaft so as to cause turning of said supporting member resulting in a vertical downward and upward movement, respectively, of said socket member, and whereby said hand truck may be steered by turning said draft member resulting in turning of said socket member about said vertical axis.

8. In a hand truck having a truck body and rear wheel means supporting said truck body at the rear end thereof, in combination, front wheel means; a shaft rotatably supporting said front wheel means; a combined supporting and pulling arrangement mounted on said shaft turnably relative to said front wheel means and including a supporting member having a cylindrical end portion and an elongated draft member serving as a lever arm for turning said supporting member about the axis of said shaft; manually operable spring loaded abutment means pivotally mounted on said supporting member and having an arcuate inner abutment face; and a ball joint composed of a socket member having a substantially spherical inner surface portion and a ball member detachably engaging said spherical inner surface portion of said socket member so as to be relatively turnable at least about a horizontal and a vertical axis, said socket member being fixedly secured to the front end of said truck body and provided with a vertically downwardly extending projection having a curved inner face being a portion of a cylindrical surface and merging into said spherical inner surface portion, and also having an arcuate outer abutment face engaged by said arcuate inner abutment face of said abutment means, said ball member being fixedly secured to said cylindrical end portion of said supporting member, said cylindrical end portion of said supporting member turnably engaging said curved inner face, said ball member being detachable from and connectable to said socket member by a substantially vertical downward and upward movement, respectively, whereby said front wheel means may be detached from said truck body and connected again therefrom by turning said draft member about said shaft so as to cause turning of said supporting member resulting in a vertical downward and upward movement, respectively, of said ball member, and whereby said hand truck may be steered by turning said draft member resulting in turning of said ball member about said vertical axis.

9. In a hand truck having a truck body and rear wheel means supporting said truck body at the rear end thereof, in combination, front wheel means; a shaft rotatably supporting said front wheel means; a combined supporting and pulling arrangement mounted on said shaft turnably relative to said front wheel means and including a supporting member having a cylindrical end portion and an elongated draft member serving as a lever arm for turning said supporting member about the axis of said shaft; a ball joint composed of a socket member having a substantially spherical inner surface portion and a curved inner face being a portion of a cylindrical surface and merging into said spherical inner surface portion, and a ball member detachably engaging said spherical inner surface portion of said socket member so as to be relatively turnable at least about a horizontal and a vertical axis, said socket member being fixedly secured to the front end of said truck body and said ball member being fixedly secured to said cylindrical end portion of said supporting member, said cylindrical end portion of said supporting member turnably engaging said curved inner face, said ball member being detachable from and connectable to said socket member by a substantially vertical downward and upward movement, respectively, whereby said front wheel means may be detached from said truck body and connected again therefrom by turning said draft member about said shaft so as to cause turning of said supporting member resulting in a vertical downward and upward movement, respectively, of said ball member, and whereby said hand truck may be steered by turning said draft member resulting in turning of said ball member about said vertical axis; and a rod connected at one end thereof to said draft member and in a substantially horizontal position adapted to engage at its other end the front end of said truck body.

10. In a hand truck having a truck body and rear wheel means supporting said truck body at the rear end thereof, in combination, front wheel means; a shaft rotatably supporting said front wheel means; a combined supporting and pulling arrangement mounted on said shaft turnably relative to said front wheel means and including a supporting member having a cylindrical end portion and an elongated draft member serving as a lever arm for turning said supporting member about the axis of said shaft; a ball joint composed of a socket member having a substantially spherical inner surface portion and a curved inner face being a portion of a cylindrical surface and merging into said spherical inner surface portion, and a ball member detachably engaging said spherical inner surface portion of said socket member so as to be relatively turnable at least about a horizontal and a vertical axis, said socket member being fixedly secured to the front end of said truck body and said ball member being fixedly secured to said cylindrical end portion of said supporting member, said cylindrical end portion of said supporting member turnably engaging said curved inner face, said ball member being detachable from and connectable to said socket member by a substantially vertical downward and upward movement, respectively, whereby said front wheel means may be detached from said truck body and connected again therefrom by turning said draft member about said shaft so as to cause turning of said supporting member resulting in a vertical downward and upward movement, respectively, of said ball member, and whereby said hand truck may be steered by turning said draft member resulting in turning of said ball member about said vertical axis; a vertically upwardly extending projecting neck portion integral with said socket member and ending in a ball-shaped end portion; and a rod pivotally connected at one end portion thereof to said draft member and having its other end portion formed with a hole so as to be adapted to pass over said ball-shaped end portion and engaging said projecting neck portion while being in a substantially horizontal position.

11. In a hand truck having a truck body and rear wheel means supporting said truck body at the rear end thereof, in combination, front wheel means; a shaft rotatably supporting said front wheel means; a combined supporting and pulling arrangement mounted on said shaft turnably relative to said front wheel means and including a supporting member having a cylindrical end portion and an elongated draft member serving as a lever arm for turning said supporting member about the axis of said shaft; and a ball joint composed of a socket member having a substantially spherical inner surface portion and a curved inner face being a portion of a cylindrical surface and merging into said spherical inner surface portion, and a ball member detachably engaging said spherical inner surface portion of said socket member so as to be relatively turnable, said socket member being mounted on the front end of said truck body pivotally about a horizontal axis, and said ball member being fixedly secured to said cylindrical end portion of said supporting member, said cylindrical end portion turnably engaging said curved face of said socket member.

12. In a hand truck having a truck body and rear wheel means supporting said truck body at the rear end thereof, in combination, front wheel means; a shaft rotatably supporting said front wheel means; a combined supporting and pulling arrangement mounted on said shaft turnably relative to said front wheel means and including a supporting member having a cylindrical end portion and an elongated draft member serving as a lever arm for turning said supporting member about the axis of said shaft; a ball joint composed of a socket member having a substantially spherical inner surface portion and a curved inner face being a portion of a cylindrical surface and merging into said spherical inner surface portion, and a ball member detachably engaging said spherical inner surface portion of said socket member so as to be relatively turnable, said socket member being mounted on the front end of said truck body pivotally about a horizontal axis, and said ball member being fixedly secured to said cylindrical end portion of said supporting member, said cylindrical end portion turnably engaging said curved face of said socket member; toggle joint means arranged between said rear wheels and said truck body supporting said rear end movable between a lower and a higher position; a rod connecting said rear wheel means with the front end of said truck body; and bar means operatively connecting said socket member and said toggle joint means so that the rear end of said truck body is lifted by straightening said toggle joint means when said socket member is turned about said horizontal axis, said latter movement being caused by pushing said wheel means by moving said draft member into a position below said platform and with said shaft located behind said horizontal axis, in which position said front end of said truck body is lifted for the same distance as said rear end of said truck body.

13. In a hand truck having a truck body and rear wheel means supporting said truck body at the rear end thereof, in combination, front wheel means; a shaft rotatably supporting said front wheel means; a combined supporting and pulling arrangement mounted on said shaft turnably relative to said front wheel means and including a supporting member having a cylindrical end portion and an elongated draft member serving as a lever arm for turning said supporting member about the axis of said shaft and being pivotally mounted on said supporting member; means to secure said draft member in a vertical and in an inclined position, respectively; abutment means pivotally mounted on said supporting member and operatively connected to said draft member so as to be in a substantially vertical operative position when said draft member is in a vertical position; and a ball joint composed of a socket member having a substantially spherical inner surface portion and a ball member detachably engaging said spherical inner surface portion of said socket member so as to be relatively turnable at least about a horizontal and a vertical axis, said socket member being fixedly secured to the front end of said truck body forwardly of said shaft and provided at its rear with a vertically downwardly extending projection having a curved inner face being a portion of a cylindrical surface and merging into said spherical inner surface portion, and also having an outer abutment face engaged by said abutment means when the same are in said vertical operative position, said ball member being fixedly secured to said cylindrical end portion of said supporting member, said cylindrical end portion of said supporting member turnably engaging said curved inner face, said ball member being detachable from and connectable to said socket member by a substantially vertical downward and upward movement, respectively, whereby said front wheel means may be detached from said truck body and connected again therefrom by turning said draft member about said shaft so as to cause turning of said supporting member resulting in a vertical downward and upward movement, respectively, of said ball member, and whereby said hand truck may be steered by turning said draft member resulting in turning of said ball member about said vertical axis.

14. In a hand truck having a truck body and rear wheel means supporting said truck body at the rear end thereof, in combination, front wheel means; a shaft rotatably supporting said front wheel means; a combined supporting and pulling arrangement mounted on said shaft turnably relative to said front wheel means and including a supporting member and an elongated draft member serving as a lever arm for turning said supporting member about the axis of said shaft; a ball joint composed of a socket member having an outer abutment face, a substantially spherical inner surface portion and a curved inner face being a portion of a cylindrical surface and merging into said spherical inner surface portion, and of a male member including a ball member detachably engaging said spherical inner surface portion of said socket member so as to be relatively turnable at least about a horizontal and a vertical axis and a cylindrical shaft portion turnably engaging said curved inner face, one of said two members forming said ball joint being fixedly secured to the front end of said truck body and the other being fixedly secured to said supporting member, said two members forming said ball joint being detachable from and connectable to each other by relative movement in a substantially vertical direction whereby said front wheel means may be detached from said truck body and connected again therefrom by turning said draft member about said shaft so as to cause turning of said supporting member resulting in a vertical downward and upward movement, respectively, of said other of said two members forming said ball joint, and whereby said hand truck may be steered by turning said draft member resulting in turning of said other of said two members forming said ball joint about said vertical axis; and abutment means formed with an inner abutment face engaging said outer abutment face of said socket member when said curved inner face of said socket member engages said cylindrical shaft portion.

PAUL SCHROEDER.

References Cited in the file of this patent

UNITED STATES PATENTS

| Number | Name | Date |
| --- | --- | --- |
| 1,081,093 | Chapman et al. | Dec. 9, 1913 |
| 1,728,839 | Staley | Sept. 17, 1929 |
| 1,740,404 | Kalberer | Dec. 17, 1929 |
| 2,241,713 | Noros | May 13, 1941 |